United States Patent
Zhou et al.

(10) Patent No.: US 12,167,349 B2
(45) Date of Patent: *Dec. 10, 2024

(54) METHOD AND DEVICE FOR TRANSMITTING AND RECEIVING SYNCHRONIZATION SIGNAL BLOCK IN 5G SYSTEM

(71) Applicant: SPREADTRUM COMMUNICATIONS (SHANGHAI) CO., LTD., Shanghai (CN)

(72) Inventors: Huayu Zhou, Shanghai (CN); Wenqiang Tian, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 86 days.

This patent is subject to a terminal disclaimer.

(21) Appl. No.: 17/564,337

(22) Filed: Dec. 29, 2021

(65) Prior Publication Data

US 2022/0124651 A1 Apr. 21, 2022

Related U.S. Application Data

(63) Continuation of application No. 15/913,996, filed on Mar. 7, 2018, now Pat. No. 11,246,108.

(30) Foreign Application Priority Data

Mar. 24, 2017 (CN) .......................... 201710184384.0

(51) Int. Cl.
H04J 3/06 (2006.01)
H04L 5/00 (2006.01)
(Continued)

(52) U.S. Cl.
CPC ......... *H04W 56/001* (2013.01); *H04L 5/0048* (2013.01); *H04W 56/009* (2013.01); *H04W 72/12* (2013.01); *H04W 72/0446* (2013.01)

(58) Field of Classification Search
CPC ............ H04W 72/12; H04W 72/0446; H04W 56/001
See application file for complete search history.

(56) References Cited

U.S. PATENT DOCUMENTS

2017/0215127 A1 7/2017 McGowan et al.
2017/0303260 A1 10/2017 Peng
(Continued)

FOREIGN PATENT DOCUMENTS

| CN | 103458512 A | 12/2013 |
| CN | 104812055 A | 7/2015 |
| WO | 2016037542 A1 | 3/2016 |

OTHER PUBLICATIONS

Hisilicon, "Overview of 5G frame structure"; 3rd Generation Partnership Project, 3GPP TSG RAN WG1 #84bis; (Apr. 11-15, 2016) R1-162157; 6 pages.

(Continued)

*Primary Examiner* — Bo Hui A Zhu
(74) *Attorney, Agent, or Firm* — CANTOR COLBURN LLP

(57) ABSTRACT

The present disclosure provides a method for transmitting and receiving a synchronization signal block in a 5G system, and a device for transmitting and receiving a synchronization signal block in a 5G system. The method includes: determining a time-domain position of a synchronization subframe, the synchronization subframe being configured to transmit the synchronization signal block, and the synchronization signal block at least comprising a signal for measurement; and transmitting the synchronization signal block according to the position of the synchronization subframe within 5 milliseconds; wherein determining a time-domain (Continued)

position of a synchronization subframe includes: determining a first subframe as the synchronization subframe within 5 milliseconds; or determining first two subframes within 5 milliseconds in a radio frame as the synchronization subframe, wherein the first two subframes comprise a first subframe and a second subframe.

8 Claims, 5 Drawing Sheets

(51) Int. Cl.
*H04W 56/00* (2009.01)
*H04W 72/12* (2023.01)
*H04W 72/0446* (2023.01)

(56) References Cited

U.S. PATENT DOCUMENTS

| | | |
|---|---|---|
| 2017/0325260 A1 | 11/2017 | Guo et al. |
| 2017/0353257 A1 | 12/2017 | Islam et al. |
| 2018/0110056 A1 | 4/2018 | Zhang et al. |
| 2018/0227867 A1 | 8/2018 | Park et al. |
| 2019/0166545 A1* | 5/2019 | Li .................. H04L 27/2666 |
| 2019/0200306 A1* | 6/2019 | Ko .................. H04J 11/0069 |
| 2019/0268205 A1 | 8/2019 | Shin et al. |
| 2020/0169980 A1* | 5/2020 | Du .................. H04W 68/005 |

OTHER PUBLICATIONS

CNIPA Office Action for corresponding CN Application No. 201710184384.0; Issued on Jul. 21, 2020.
USPTO Non-Final Office Action for corresponding U.S. Appl. No. 15/913,996; Dated, Mar. 11, 2020.
USPTO Non-Final Office Action for corresponding U.S. Appl. No. 15/913,996; Dated, May 2, 2019.

* cited by examiner

METHOD AND DEVICE FOR TRANSMITTING AND RECEIVING SYNCHRONIZATION SIGNAL BLOCK IN 5G SYSTEM

CROSS-REFERENCE TO RELATED APPLICATIONS

This application is a Continuation Application of the U.S. patent application Ser. No. 15/913,996, filed on Mar. 7, 2018, the entire contents of which are incorporated herein by reference. The Ser. No. 15/913,996 application claimed the benefit of the date of the earlier filed Chinese Patent Application No. 201710184384.0, filed on Mar. 24, 2017, priority to which is also claimed herein, and the contents of which are also incorporated herein by reference.

TECHNICAL FIELD

The present disclosure relates to the field of communication, and more particularly, to a method for transmitting and receiving a synchronization signal block in a 5G system, and a device for transmitting and receiving a synchronization signal block in a 5G system.

BACKGROUND

With the development of communication technology, 5G system research is developed. In a 5G system, the available resources are different from those in the existing system, and the signal and channel for the User Equipment (UE) measurement and the cell initial selection have characteristics which are different from those of LTE. Accordingly, the transmission mode of these signals and channels also requires corresponding design.

At present, there is a need for the design of the signal and channel for measurement and initial cell selection in a 5G system.

SUMMARY

Embodiments of the present disclosure provide a method and a device for transmission of a synchronization signal block in a 5G system.

An embodiment of the present disclosure provides a method for transmitting a synchronization signal block in a 5G system, including: determining a position of a synchronization subframe, the synchronization subframe being configured to transmit the synchronization signal block, and the synchronization signal block at least including a signal for measurement; and transmitting the synchronization signal block according to the position of the synchronization subframe within a minimum period for the uplink/downlink configuration in a LTE system.

In some embodiment, determining the position of the synchronization subframe includes: determining the first subframe and the sixth subframe in a radio frame as the synchronization subframe.

In some embodiment, determining the position of the synchronization subframe further includes: adding the second subframe and the seventh subframe in a radio frame as the synchronization subframe.

In some embodiment, prior to adding the second subframe and the seventh subframe as the synchronization subframe during determining the position of the synchronization subframe, the method further includes: determining a frequency of frequency resources for transmitting the synchronization subframe being greater than a preset threshold; and adding the second subframe and the seventh subframe in a radio frame as the synchronization subframe.

In some embodiment, the synchronization signal block transmitted through the first subframe and the synchronization signal block transmitted through the sixth subframe further include a signal and a channel for an initial cell selection.

In some embodiment, the signal and the channel for an initial cell selection at least include a broadcast channel.

In some embodiment, when a number of downlink symbols in the synchronization subframe is within a preset range, the synchronization signal block transmitted through the second subframe and the synchronization signal block transmitted through the seventh subframe only include a signal for measurement.

In some embodiment, the synchronization signal block further includes a signal and a channel for an initial cell selection.

In some embodiment, prior to transmitting the synchronization signal block according to the position of the synchronization subframe, the method further includes: determining that a number of downlink symbols in the synchronization signal block being within a preset range, wherein the synchronization signal block only includes the signal for measurement.

In some embodiment, the signal for measurement includes: a primary synchronization signal and a secondary synchronization signal.

In some embodiment, the synchronization subframe is further configured to carry a common control message.

In some embodiment, the synchronization subframe is further configured to carry scheduling information of the common control message.

In some embodiment, the minimum period for the uplink/downlink configuration in a LTE system is 5 milliseconds.

In some embodiment, a length of the synchronization subframe is 1 millisecond.

An embodiment of the present disclosure further provides a method for receiving a synchronization signal block in a 5G system, including: determining a position of a synchronization subframe, the synchronization subframe being configured to transmit the synchronization signal block, and the synchronization signal block at least including a signal for measurement; and detecting or measuring the synchronization signal block according to the position of the synchronization subframe within a minimum period for the uplink/downlink configuration in a LTE system.

In some embodiment, after an initial cell selection is completed, measuring the synchronization signal block according to the position of the synchronization subframe includes: conducting a synchronization signal block measurement in the first subframe or the sixth subframe in a radio frame.

In some embodiment, after an initial cell selection is completed, measuring the synchronization signal block according to the position of the synchronization subframe includes: measuring the synchronization signal block in the first subframe and the second subframe, or measuring the synchronization signal block in the sixth subframe and seventh subframe in a radio frame.

In some embodiment, if an initial cell selection is ongoing, detecting the synchronization signal block according to the position of the synchronization subframe includes: conducting a broadcast channel detection in both the first subframe and the second subframe; or conducting the broadcast channel detection in both the sixth subframe and seventh subframe in a radio frame.

In some embodiment, determining the position of the synchronization subframe includes: determining a boundary of the synchronization subframe according to a TSS.

In some embodiment, the TSS is further configured to be a demodulation reference signal for a broadcast channel.

In some embodiment, determining the position of the synchronization subframe includes: determining the position of the synchronization subframe in a default setting.

An embodiment of the present disclosure further provides a device for transmitting a synchronization signal block in a 5G system, including: a first position determination circuitry, configured to determine a position of a synchronization subframe, the synchronization subframe being configured to transmit the synchronization signal block, and the synchronization signal block at least including a signal for measurement; and a synchronization signal block transmitting circuitry, configured to transmit the synchronization signal block according to the position of the synchronization subframe within a minimum period for the uplink/downlink configuration in a LTE system.

In some embodiment, the first position determination circuitry includes a first determination sub-circuitry, configured to determine the first subframe and the sixth subframe in a radio frame as the synchronization subframe.

In some embodiment, determining the position of the synchronization subframe further includes: a second determination sub-circuitry, configured to add the second subframe and the seventh subframe in a radio frame as the synchronization subframe.

In some embodiment, the first position determination circuitry further includes: a frequency determination sub-circuitry, configured to determine that a frequency of frequency resources for transmitting the synchronization subframe is greater than a preset threshold, before a second determination sub-circuitry adds the second subframe and the seventh subframe in a radio frame as the synchronization subframe.

In some embodiment, the synchronization signal block transmitted through the first subframe and the synchronization signal block transmitted through the sixth subframe further include a signal and a channel for an initial cell selection.

In some embodiment, the signal and the channel for an initial cell selection at least include a broadcast channel.

In some embodiment, when a number of downlink symbols in the synchronization subframe is within a preset range, the synchronization signal block transmitted through the second subframe and the synchronization signal transmitted through the seventh subframe only include a signal for measurement.

In some embodiment, the synchronization signal block further includes a signal and a channel for an initial cell selection.

In some embodiment, the device further includes a symbol number determination circuitry, configured to determine that a number of downlink symbols in the synchronization subframe is within a preset range before transmitting the synchronization signal block according to the position of the synchronization subframe; the synchronization signal block only includes the signal for measurement.

In some embodiment, the signal for measurement includes: a primary synchronization signal and a secondary synchronization signal.

In some embodiment, the synchronization subframe is further configured to carry a common control message.

In some embodiment, the synchronization subframe is further configured to carry scheduling information of the common control message.

In some embodiment, the minimum period for the uplink/downlink configuration in a LTE system is 5 milliseconds.

In some embodiment, a length of the synchronization subframe is 1 millisecond.

An embodiment of the present disclosure further provides a device for receiving a synchronization signal block in a 5G system, including:

a second position determination circuitry, configured to determine a position of a synchronization subframe, the synchronization subframe being configured to transmit the synchronization subframe, and the synchronization signal block at least including a signal for measurement; and a synchronization signal block receiving circuitry, configured to detect or measure the synchronization signal block according to the position of the synchronization subframe within a minimum period for the uplink/downlink configuration in a LTE system.

In some embodiment, after an initial cell selection is completed, the synchronization signal block receiving circuitry is configured to conduct a synchronization signal block measurement in the first subframe or the sixth subframe in a radio frame.

In some embodiment, after an initial cell selection is completed, the synchronization signal block receiving circuitry is configured to measure the synchronization signal block in the first subframe and the second subframe, or measure the synchronization signal block in the sixth subframe and seventh subframe in a radio frame.

In some embodiment, if an initial cell selection is ongoing, the synchronization signal block receiving circuitry is configured to conduct a broadcast channel detection in both the first subframe and the second subframe; or conduct the broadcast channel detection in both the sixth subframe and seventh subframe in a radio frame.

In some embodiment, the second position determination circuitry is configured to determine a boundary of the synchronization subframe according to a TSS.

In some embodiment, the TSS is further configured to be a demodulation reference signal for a broadcast channel.

In some embodiment, the second position circuitry is configured to determine the position of the synchronization subframe in a default setting.

Compared with the prior art, embodiments of the present disclosure has following benefits:

A network side transmits a synchronization signal block according to a position of the synchronization subframe within a minimum period for the uplink/downlink configuration in a LTE system. Since the synchronization signal block is transmitted within a minimum period for the uplink/downlink configuration in a LTE system, it is advantageous to maintain the consistency between a 5G system and a LTE system. Accordingly, when a base station of a LTE system and a base station of a 5G system are co-located, the interference between a 5G system and a LTE system may be avoided.

Further, the minimum period for the uplink/downlink configuration in a LTE system may be 5 milliseconds, and a length of the synchronization subframe may be 1 millisecond. Accordingly, the network side may finish a transmission of the synchronization signal block required by a complete measurement within 5 milliseconds, and a user equipment may finish a measurement within 5 milliseconds. In this way, flexibility of the frame structure in a radio frame may be ensured, and complexity of the blind detection of the user equipment may be balanced, so that complexity of the blind detection of the user equipment is not too high.

In addition, determining a position of the synchronization subframe at the user equipment side, so that a position of the synchronization subframe at the user equipment side is known by default. Accordingly, the user equipment may directly conduct the synchronization signal block detection according to the position of the default synchronization subframe and save signaling resources of indications from the network side to the user equipment.

DETAILED DESCRIPTION

In a 5G system, a signal and a channel for a detection and an initial cell selection may include a primary synchronization signal, a secondary synchronization signal and a broadcast channel, which may be similar to a primary synchronization signal (PSS), a secondary synchronization signal (SSS) and a physical broadcast channel (PBCH) in LTE, or may have a different design from the existing channel in LTE.

In a 5G system, the primary synchronization signal, the secondary synchronization signal, the broadcast channel and other signals and channels for measurement or an initial cell selection may be integrated in a synchronization signal block, and each synchronization signal block may be resources of a beam in the process of beam sweeping. Multiple synchronization blocks may constitute a synchronization signal burst (SS-burst). The synchronization signal burst may be a relatively concentrated resource including multiple beams. Multiple synchronization signal burst may constitute a synchronization signal burst set (SS-burst-set).

In an embodiment of the present disclosure, a network side transmits the synchronization signal block according to a position of the synchronization subframe within a minimum period for the uplink/downlink configuration in a LTE system. Since the synchronization signal block is transmitted within a minimum period for the uplink/downlink configuration in a LTE system, which is advantageous to maintain a consistency between a 5G system and a LTE system. Accordingly, when a base station of a LTE system and a base station of a 5G system are co-located, the interference between the 5G system and the LTE system may be avoided.

In order that the above objects, characteristics and advantages of the present disclosure become more apparent, and embodiments of the present disclosure are described in detail with reference to the drawings.

Figure 1:
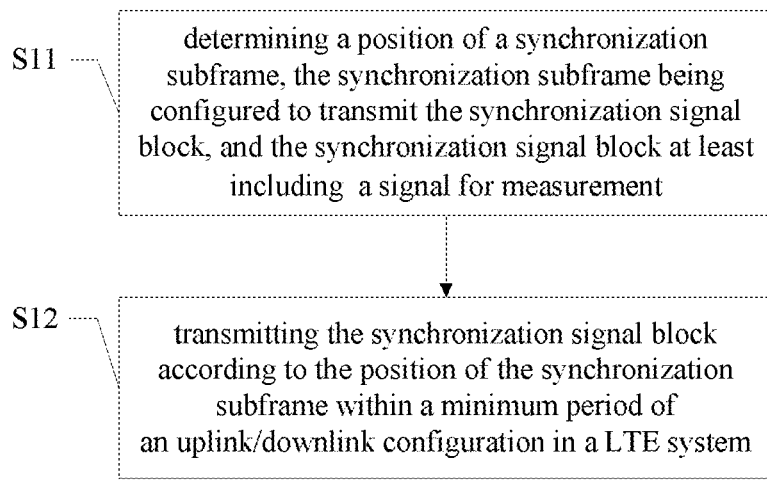
FIG. 1 schematically illustrates a flow diagram of a method for transmitting a synchronization signal block in a 5G system according to an embodiment of the present disclosure.

FIG. 1 schematically illustrates a flow diagram of a method for transmitting a synchronization signal block in a 5G system according to embodiments of the present disclosure, and may include the following steps:

S11, determining a position of the synchronization subframe, the synchronization subframe being configured to transmit the synchronization signal block, and the synchronization signal block at least including a signal for measurement; and S12, transmitting the synchronization signal block according to the position of the synchronization subframe within a minimum period for the uplink/downlink configuration in a LTE system.

Wherein the signal for measurement may be the primary synchronization signal and the secondary synchronization signal. The synchronization signal block may only include the main synchronization signal and the secondary synchronization signal. The synchronization subframe may be a subframe which contains the synchronization signal block.

The synchronization subframe is configured to transmit the synchronization signal block, and the synchronization signal block may at least include a signal for measurement, and specifically, the synchronization signal block may include only the main synchronization signal and the secondary synchronization signal. The synchronization signal block may further include the signal and channel for an initial cell selection, for example, a broadcast channel is further included on the basis of including the primary synchronization signal and the secondary synchronization signal, or a tertiary synchronization signal (TSS) is further included.

Concrete contents of the synchronization signal block may be determined according to the position of the synchronization subframe, and contents of the synchronization signal block transmitted at different positions of synchronization subframe may be different.

A user equipment may perform detection and measurement in the synchronization subframe, and specifically, when the user equipment does not conduct an initial cell selection, the synchronization subframe may be detected. After the user equipment completes the access, it is possible to only perform measurement in the synchronization subframe, and to determine whether to conduct cell handover and so forth according to the result of the measurement.

The minimum period for the uplink/downlink configuration in a LTE system may be 5 milliseconds, and a length of the synchronization subframe may be 1 millisecond. A period of the synchronization signal burst for the synchronization signal block including the signal and channel for completing an initial cell selection may be 10 milliseconds or 20 milliseconds, which is a period of cycle transmission for the synchronization signal block including the signal and channel for completing an initial cell selection.

Specifically, contents of the synchronization signal block may be different in one period, and contents of all the synchronization signal blocks in one period maybe be combined and jointly provide a signal or a channel for access to the user equipment. However, in each 5 milliseconds, there is a transmission of the synchronization signal blocks, and each synchronization signal block at least includes a signal for measurement, and specifically, a signal for the user equipment to complete the measurement.

Accordingly, the signal for measurement may be provided for the user equipment that completes an initial cell access in 5 milliseconds so that the user equipment may complete a measurement in 5 milliseconds. Further, the user equipment in the connection state may complete a measurement related with a cell handover in 5 milliseconds, which may shorten the time that the user equipment in the connection state conducts the cell handover, thereby improving user experience.

For the user equipment which does not conduct an initial cell selection, a network side may provide a signal and channel support for a longer period. Since the user equipment that do not conduct an initial cell selection are generally in a disconnection state, and do not conduct a business processing, the requirement for time of completing an initial cell selection is relatively low.

In some embodiment, the first subframe and the sixth subframe in a radio frame may be determined as the synchronization subframe, that is, the number 0 subframe and the number 5 subframe in a radio frame may be determined as the synchronization subframe.

Because the first subframe and the sixth subframe in a radio frame are usually downlink subframes in a LTE system. For example, in the time division duplexing (TDD), the first subframe and the sixth subframe are fixedly configured to transmit the primary synchronization signal. Accordingly, determining the first subframe and the sixth subframe as the synchronization subframe, which maintains the consistency of the uplink and downlink transmission directions to a great extent between a LTE system and a 5G system, and further coordinates a 5G system and a LTE system and reduce the interference between each other.

After determining the synchronization subframes as the first subframe and the sixth subframe, the network side may transmit the synchronization signal block through the first subframe in a minimum period for the uplink/downlink configuration in a LTE system, and may conduct the synchronization signal block transmission through the sixth subframe in a next minimum period for the uplink/downlink configuration in a LTE system.

When the network side may allocate more downlink time slots or time slots mainly downlink, or when the network side requires more beams to cover the whole cell in the high frequency range, the network side may further determine more subframes as the synchronization subframes according to situations, and notify the user equipment through a signaling to conduct the corresponding measurement. It should be noted that, if the user equipment completes an initial cell selection at this time, it may obtain the signaling of the network side.

On the other hand, when the network side determines that the first subframe and the sixth subframe in a radio frame as the synchronization subframe, it may not transmit the signaling to the user equipment, and the user equipment may default to perform measurement in the first subframe and the sixth subframe in a radio frame. So that, it may save signaling resources for an indication from the network side to the user equipment.

Figure 2:
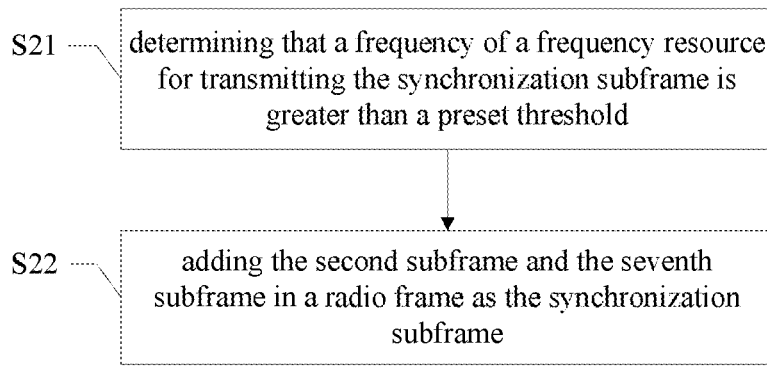
FIG. 2 schematically illustrates a partial flow diagram of an embodiment for S11 in FIG. 1.

Referring to FIG. 2, on the basis of determining the first subframe and the sixth subframe in a radio frame as the synchronization subframe, the method may add the synchronization subframe by the following steps:

S21, determining a frequency of frequency resources for transmitting the synchronization subframe is greater than a preset threshold; and S22, adding the second subframe and the seventh subframe in a radio frame as the synchronization subframe.

For example, for a network having a subcarrier spacing of 15/30 kHz, the first subframe and the sixth subframe in a radio frame are determined as the synchronization subframe; for a network having a subcarrier spacing of 120/240 kHz, the first subframe, the second subframe, the sixth subframe, and the seventh subframe in a radio frame are determined as the synchronization subframe.

Since more beams are required to cover the whole cell when a frequency of a communication system is greater than a preset threshold, more synchronization subframes are required for transmitting the synchronization signal block.

The position of the synchronization subframe may be determined follows the step of determining the subcarrier spacing and the synchronization subframe may be seen as the default subframe.

When the first subframe, the second subframe, the sixth subframe, and the seventh subframe in a radio frame are determined as the synchronization subframe, the network side may transmit the synchronization signal block through the first subframe and the second subframe in a minimum period for the uplink/downlink configuration in a LTE system; and may transmit the synchronization signal block through the sixth subframe and the seventh subframe in a next minimum period for the uplink/downlink configuration in a LTE system.

In some embodiment of the present disclosure, contents of the synchronization signal block transmitted through different synchronization subframes may be same or different. But the synchronization signal block transmitted through different synchronization subframes includes at least a signal for measurement. That is, the synchronization signal block may include only the signals related to the measurement like the primary synchronization signal and the secondary synchronization signal and so forth.

Further, the synchronization signal block may also include a signal and a channel for an initial cell selection, for example, it includes a broadcast channel. Furthermore, the synchronization signal block further includes a tertiary synchronization signal, and the tertiary synchronization signal provides the index information of the synchronization signal block, and after the user equipment detects the tertiary synchronization signal, it obtains timing information.

In some embodiment, the synchronization signal block transmitted by the network side through the first subframe and the sixth subframe may include all signals and channels required by the user equipment to complete an initial cell selection, so that the user equipment that not access may complete detection and access.

The signal and the channel included in the synchronization signal block may be configured by the network side according to the determined position of the synchronization subframe, which is described as below.

In one embodiment of the present disclosure, the synchronization signal block transmitted through the first subframe may include a signal for measurement, and may further include a signal a channel for initial cell selection. The signal for measurement may include a primary synchronization signal and a secondary synchronization signal, and the signal and the channel for an initial cell selection at least include a broadcast channel.

If the position of the synchronization subframe determined by the network side further includes the second subframe and the seventh subframe, the synchronization signal block transmitted through the second subframe and the synchronization signal block transmitted through the seventh subframe may only include the signal for measurement.

Specifically, the network side may determine that when a number of downlink symbols in the synchronization subframe is within a preset range, the synchronization signal block transmitted through the second subframe and the synchronization signal transmitted through the seventh subframe are configured to only include the signal for measurement.

The number of downlink symbols in the synchronization subframe being within a preset range means that the number of downlink symbols is not sufficient to support the transmission of both the signal for measurement and the signal for an initial cell selection.

For example, when a LTE system and a 5G system are co-located, in order to avoid cross interference between different systems, when determining a position of a synchronization subframe, the position of the synchronization subframe is determined according to the uplink/downlink configuration in a LTE system. Specifically, the uplink/downlink configuration in a radio frame in a 5G system is consistent with the uplink/downlink configuration for time division duplex in a LTE system.

In this case, in some subframes, the number of symbols may not be sufficient to support the transmission of both the signal for measurement and the signal for an initial cell selection. For example, in the second subframe and the seventh subframe, only the first three symbols are downlink symbols, and usually the first downlink symbol is configured for the downlink control channel, therefore, in the second subframe or the seventh subframe, the symbol is not be sufficient to support the transmission of both the signal for measurement and the signal for an initial cell selection. In this case, the synchronization signal block transmitted through the second subframe and the synchronization signal block transmitted through the seventh subframe are configured to only include the signal for measurement.

The specific contents of the synchronization signal block in some embodiment of the present disclosure can be flexibly configured according to the specific scenario. All synchronization signal blocks may be configured to include both the signal for measurement and other signals and channels for an initial cell selection, or the synchronization signal block may be configured to only include the signal for measurement, when determining the number of downlink symbols in the synchronization subframe is within a preset range.

In some embodiment, the synchronization subframe may be further configured to carry a common control message and/or scheduling information of the common control message. The common control message and the scheduling information of the common control message may be multiplexed with the synchronization signal block.

In some embodiment of the present disclosure, the minimum period for the uplink/downlink configuration in a LTE system may be 5 milliseconds, and the length of the synchronization subframe may be 1 millisecond. Accordingly, the network side may finish a transmission of the synchronization signal block required by a complete measurement once within 5 milliseconds, and the user equipment may finish a measurement once within 5 milliseconds. In this way, flexibility of the frame structure in a radio frame may be ensured, and complexity of the blind detection of the user equipment may be balanced, so that complexity that the user equipment conducts the blind detection is not too high.

Figure 3:
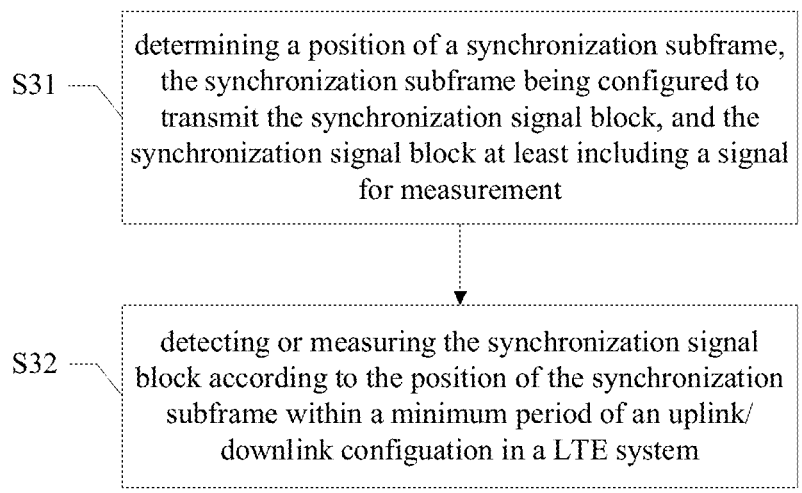
FIG. 3 schematically illustrates a flow diagram of a method for receiving the synchronization signal block according to an embodiment of the present disclosure.

Embodiments of the present disclosure further provide a method for receiving a synchronization signal block and applies to a user equipment, and a flow diagram of which may be referred to FIG. 3, and may specifically include the following steps:

S31, determining a position of a synchronization subframe, the synchronization subframe being configured to transmit the synchronization signal block, and the synchronization signal block at least including a signal for measurement; and S32, detecting or measuring the synchronization signal block according to the position of the synchronization subframe within a minimum period for the uplink/downlink configuration in a LTE system.

The position of the synchronization subframe at a user equipment side may be in default, that is, that determining the position of the synchronization subframe may be that determining the position of the synchronization subframe in the default setting. Accordingly, the user equipment may directly detect or measure the synchronization signal block according to the position of the default synchronization subframe, and save signaling resources for the indication from a network side to the user equipment. The position of the synchronization subframe defaulted by the user equipment may correspond to the synchronization signal burst, that is, the synchronization signal block may be configured to measure multiple beam sweeping according to the position of the default synchronization subframe.

The position of the synchronization subframe may correspond to a period of the synchronization signal burst. In some embodiment of the present disclosure, it may be a minimum period for the uplink/downlink configuration in a LTE system, that is, 5 milliseconds. The user equipment may default that the period of the synchronization signal burst set is 5 milliseconds, to detect or measure the synchronization signal block. The user equipment may further accept an indication from the network side to derive the position of the synchronization subframe corresponding to the indication, thereby determining a moment and a duration of the subsequent measurement.

When receiving the synchronization signal block, the user equipment may not know specific contents included in the synchronization signal block, and the user equipment may determine to detect or measure the synchronization signal block according to its own state. When the user equipment does not conduct an initial cell selection, it conducts the synchronization signal block detection, and when the user equipment accessed, it may only conduct the synchronization signal block measurement.

When the user equipment conducts the synchronization signal block detection, if contents of the synchronization signal block within 5 milliseconds are not sufficient to support the user equipment access, the user equipment may continue to detect within the next 5 milliseconds until successfully obtaining a position of the signal and the channel to support the user equipment access.

In some embodiment, the user equipment may default to detect or measure the synchronization signal block in the first subframe or the sixth subframe in a radio frame. That is, the user equipment may complete the detection and measurement for the synchronization signal block of the first subframe in one minimum configuration time period in a LTE system, and complete the detection and measurement for the synchronization signal block of the sixth subframe in the next minimum configuration time period in a LTE system. For example, the user equipment completes the detection and measurement for the synchronization signal block of the first subframe in the first 5 milliseconds, and completes the detection and measurement for the synchronization signal block of the sixth subframe in the next 5 milliseconds.

As mentioned previously, the network side may transmit the synchronization signal block in the first subframe or the sixth subframe, and the synchronization signal block at least includes the signal for measurement. The user equipment may complete a measurement within 5 milliseconds, after the user equipment completed an initial cell selection. Correspondingly, the network side may transmit the synchronization signal block required by a complete measurement within 5 milliseconds.

The user equipment may further conduct the detection or measurement for the broadcast channel in both the first subframe and the second subframe in a radio frame within one minimum period for the uplink/downlink configuration in a LTE system; and conduct the detection or measurement for the broadcast channel in both the sixth subframe and the seventh subframe within next minimum period for the uplink/downlink configuration in a LTE system.

According to the description in the method for transmitting the synchronization signal block, the network side may conduct the synchronization signal block transmission through the first subframe, the second subframe, the sixth subframe, and the seventh subframe respectively within different minimum period of the uplink/downlink configuration in a LTE system. Correspondingly, the user equipment may conduct the synchronization signal block detection or measurement through the first subframe, the second subframe, the sixth subframe, and the seventh subframe respectively within different minimum period for the uplink/downlink configuration in a LTE system.

When the network side transmits the synchronization signal block through different subframes, contents of the synchronization signal block may be different. Since the user equipment does not know how the network side configures contents of the synchronization signal block, the user equipment may conduct undifferentiated blind detection.

The user equipment may further detect or measure the synchronization signal block according to its own needs. For example, after an initial cell selection is completed, the user equipment only measures the signal for measurement.

If an initial cell selection is ongoing, user equipment may conduct the broadcast channel detection in both the first subframe and the second subframe in a radio frame; and conduct the broadcast channel detection in both the sixth subframe and the seventh subframe. The detection for the broadcast channel in both the first subframe and the second subframe in a radio frame; and the detection for the broadcast channel in both the sixth subframe and the seventh subframe may be completed in a minimum period for the uplink/downlink configuration in an adjacent LTE system.

When the user equipment conducts an initial cell selection, a complete cell search is required. For example, it includes a PSS/SSS detection, a 10 milliseconds timing, a broadcast channel decoding, an acquisition of information carried by the broadcast channel and so forth. Accordingly, if an initial cell selection is ongoing, the user equipment determines that all subframes in the network side for transmitting the synchronization signal block to conduct the blind detection, to attempt to complete the whole cell search.

Since the user equipment do not conduct completed access, the boundary positioning for the first subframe, the second subframe, the sixth subframe, and the seventh subframe may be obtained according to other signals and, for example, obtained according to the TSS. Specifically, it obtains the index value of the synchronization signal block through detecting the TSS, thereby obtaining the position of the synchronization signal block in the default synchronization subframe, and obtaining the boundary of the default synchronization subframe. The TSS is placed in the PBCH as the demodulation reference signal for the PBCH.

The number of one synchronization signal block may be one or more, and the upper limit on the number of the synchronization signal block is limited by the number of symbols in the subframe and the number of symbols required by the synchronization signal block.

Figure 7:
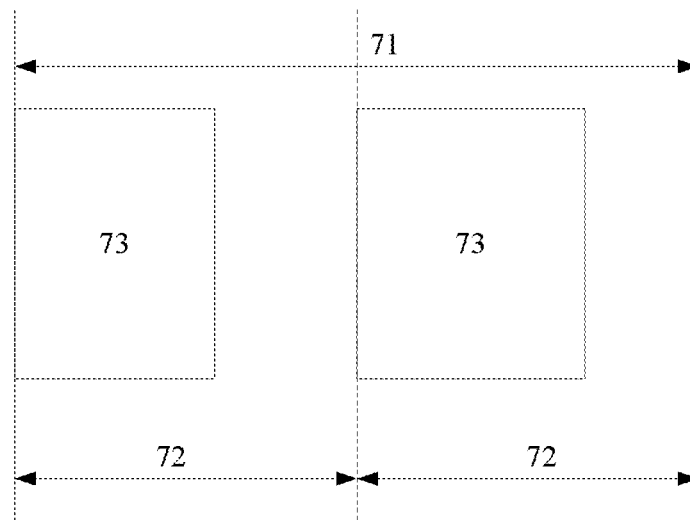
FIG. 7 schematically illustrates a position of the synchronization signal block within a synchronization subframe according to an embodiment of the present disclosure.

For example, referring to FIG. 7, when one synchronization signal block 73 occupies 3 or 4 symbols and each time slot 72 in one subframe has 7 symbols, 2 synchronization signal blocks 73 in the synchronization subframe 71 are transmitted at most.

The position of the synchronization signal block 73 shown in FIG. 7 may be applied in a scenario that the first subframe and the sixth subframe in a radio frame are determined as the synchronization subframe 71, and the second subframe and the seventh subframe are not determined as the synchronization subframe 71. Both the first subframe and the sixth subframe may be configured as shown in FIG. 7. The above resource condition may correspond to a subcarrier spacing of 15 kHz. At this time, the subcarrier spacing of 15 kHz may support the transmission of 2 synchronization signal blocks 73 at most.

The position of the synchronization signal block 73 shown in FIG. 7 may be further applied in a scenario that the first subframe, the second subframe, the sixth subframe, and the seventh subframe in a radio frame are determined as the synchronization subframe 71. All or part of the first subframe, the second subframe, the sixth subframe, and the seventh subframe may be further configured in the manner as shown in FIG. 7. After the first subframe, the second subframe, the sixth subframe, and the seventh subframe are all configured as shown in FIG. 7, the subcarrier spacing of 15 kHz may support the transmission of 4 synchronization signal blocks 73 at most.

More synchronization signal blocks may be transmitted in one subframe. For example, referring to FIG. 8, there are 14 symbols in a time slot 82, 28 symbols in a synchronization subframe 81. When each synchronization signal block 83 needs to occupy 4 symbols, three synchronization signals block 83 are transmitted in a time slot 82. The above resource conditions may correspond to a subcarrier spacing of 30 kHz. After the configuration manner as shown in FIG. 8 is applied in a scenario that the first subframe and the sixth subframe in a radio frame are determined as the synchronization subframe 81, the subcarrier spacing of 30 kHz supports the transmission of 6 synchronization signal blocks 83 at most.

Figure 8:
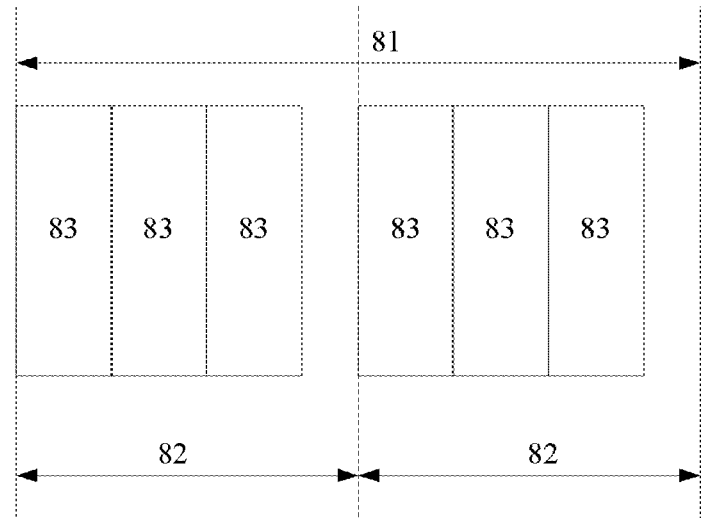
FIG. 8 schematically illustrates a position of the synchronization signal block within the synchronization subframe according to an embodiment of the present disclosure.

The configuration manner as shown in FIG. 8 may be further applied in a scenario that when the first subframe, the second subframe, the sixth subframe, and the seventh subframe in a radio frame are determined as the synchronization subframe 81. All or part of the first subframe, the second subframe, the sixth subframe, and the seventh subframe may be further configured in the manner as shown in FIG. 8.

After the first subframe, the second subframe, the sixth subframe, and the seventh subframe are all configured as shown in FIG. 8, the subcarrier spacing of 30 kHz may support the transmission of 12 synchronization signal blocks 83 at most.

Figure 9:
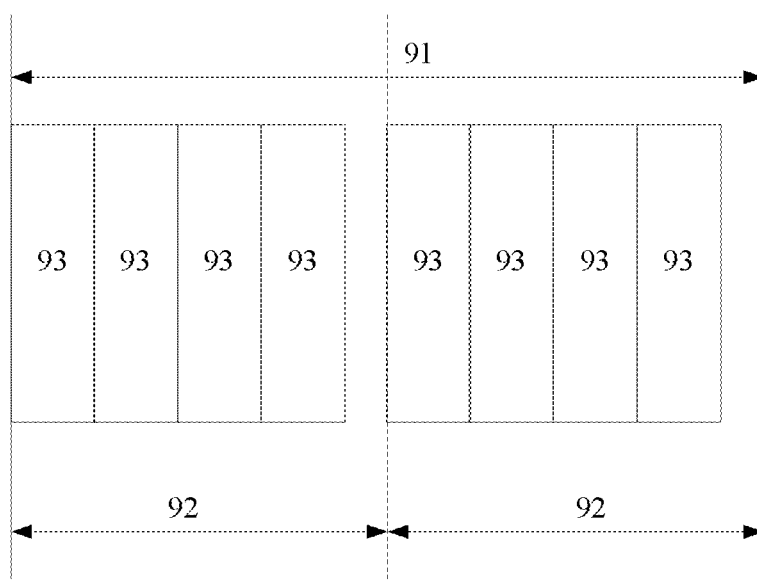
FIG. 9 schematically illustrates a position of the synchronization signal block within the synchronization subframe according to an embodiment of the present disclosure.

Referring to FIG. 9, if the synchronization signal block 93 need to occupy three symbols, and there are 14 symbols in a time slot 92, 28 symbols in a synchronization subframe 91, 4 synchronization signal blocks 93 may be transmitted in a time slot 92. The above resource conditions may correspond to a subcarrier spacing of 30 kHz. Accordingly, the subcarrier spacing of 30 kHz may support the transmission of 8 synchronization signal blocks 93 at most in a synchronization subframe 91.

After the configuration manner as shown in FIG. 9 is configured to determine the first subframe and the sixth subframe in a radio frame as the synchronization subframe 91, the subcarrier spacing of 30 kHz may support the transmission of 8 synchronization signal blocks 93 at most.

The configuration manner as shown in FIG. 9 may be further applied in a scenario that when determining the first subframe, the second subframe, the sixth subframe, and the seventh subframe in a radio frame are determined as the synchronization subframe 91. All or part of the first subframe, the second subframe, the sixth subframe, and the seventh subframe may be further configured in the manner as shown in FIG. 9.

After the first subframe, the second subframe, the sixth subframe, and the seventh subframe are all configured as shown in FIG. 9, the subcarrier spacing of 30 kHz may support the transmission of 16 synchronization signal blocks 93 at most.

Figure 10:
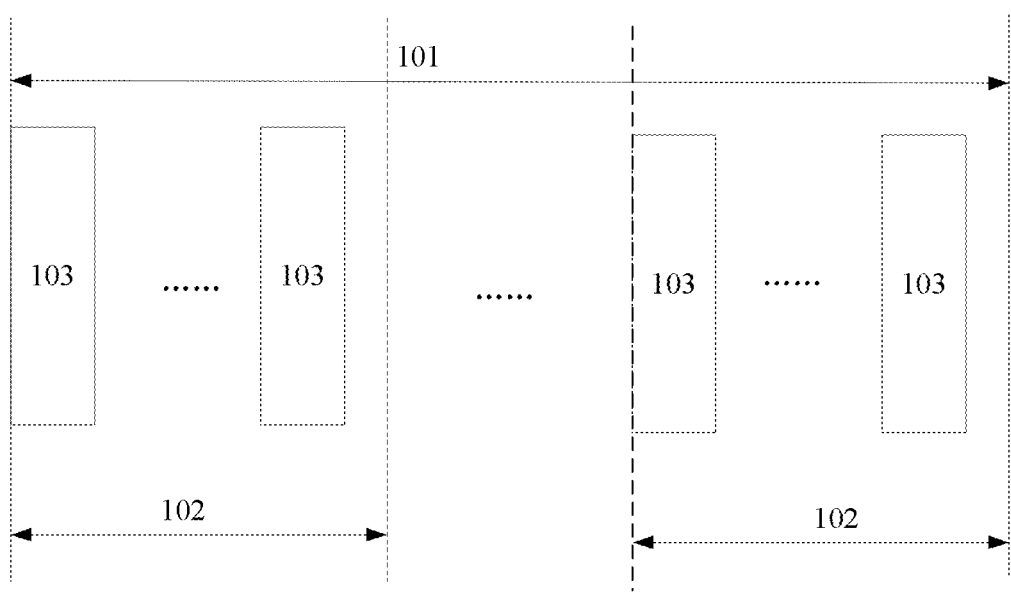
FIG. 10 schematically illustrates a position of the synchronization signal block within the synchronization subframe according to an embodiment of the present disclosure.

When a subcarrier spacing is 120 kHz, referring to FIG. 10, each synchronization signal block 103 may occupy 3 or 4 symbols.

The upper limit on the number of the synchronization signal block may be limited together by the number of symbols occupied by each synchronization signal block 103 and the number of symbol in each time slot 102, and the total number of symbols in the synchronization subframe 101.

When each synchronization signal block 103 occupies 4 symbols, which is applied in a scenario that the first subframe and the sixth subframe in a radio frame are determined as the synchronization subframe 101, the subcarrier spacing of 120 kHz may transmit 24 synchronization signal blocks 103 at most. When each synchronization signal block 103 occupies 3 symbols, the subcarrier spacing of 120 kHz may transmit 32 synchronization signal blocks 103 at most.

Correspondingly, when a subcarrier spacing is 240 kHz, which is applied in a scenario that determining the first subframe and the sixth subframe in a radio frame are determined as the synchronization subframe 101, when each synchronization signal block 103 occupies 4 symbols, the subcarrier spacing of 240 kHz may transmit 48 synchronization signal block 103 at most. When each synchronization signal block 103 occupies 3 symbols, the subcarrier spacing of 240 kHz may transmit 64 synchronization signal block 103 at most.

When each synchronization signal block 103 occupies 4 symbols, which is applied in a scenario that the first subframe, the second subframe, the sixth subframe, and the seventh subframe in a radio frame are determined as the synchronization subframe 101, the subcarrier spacing of 120 kHz may transmit 48 synchronization signal blocks 103 at most. When each synchronization signal block 103 occupies 3 symbols, the subcarrier spacing of 120 kHz may transmit 64 synchronization signal blocks 103 at most.

Correspondingly, when the subcarrier spacing is 240 kHz, which is applied in a scenario that the first subframe, the second subframe, the sixth subframe, and the seventh subframe in a radio frame are determined as the synchronization subframe 101, when each synchronization signal block 103 occupies 4 symbols, the subcarrier spacing of 240 kHz may transmit 96 synchronization signal block 103 at most. When each synchronization signal block 103 occupies 3 symbols, the subcarrier spacing of 240 kHz may transmit 128 synchronization signal block 103 at most.

From the above, the number of one synchronization signal block may be one or more, and the upper limit on the number of the synchronization signal block is limited by the number of symbols in the subframe and the number of symbols required by the synchronization signal block.

Further, the upper limit on the number of the synchronization signal block may be limited together by the number of symbols occupied by each synchronization signal block and the number of symbol in each time slot, and the total number of symbols in the synchronization subframe.

When the synchronization subframe transmits multiple synchronization signal blocks, the synchronization signal block may use the symbol as the unit, and a start position of the synchronization block may be aligned with a start position of the symbol.

Those skilled in the art may understand that FIG. 7 to FIG. 10 are schematic and do not represent actual ratios of frequency domain or time domain.

Figure 4:
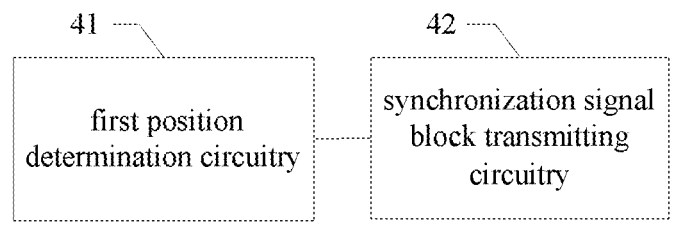
FIG. 4 schematically illustrates a structural schematic diagram of a device for transmitting the synchronization signal block in a 5G system according to an embodiment of the present disclosure.

Embodiments of the present disclosure further provides a device for transmitting a synchronization signal block, and its structural schematic diagram shown in FIG. 4, which may specifically include:

a first position determination circuitry 41, configured to determine a position of a synchronization subframe, the synchronization subframe being configured to transmit the synchronization signal block, and the synchronization signal block at least includes a signal for measurement; and a synchronization signal block transmitting circuitry 42, configured to transmit the synchronization signal block according to the position of the synchronization subframe within a minimum period for the uplink/downlink configuration in a LTE system.

Figure 5:
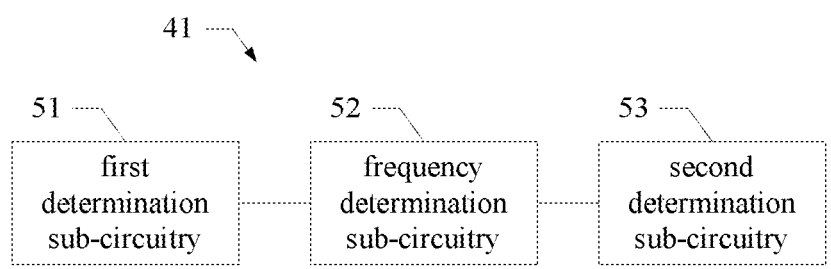
FIG. 5 schematically illustrates a structural schematic diagram of an example of a first position determination circuitry according to an embodiment of the present disclosure.

In some embodiment, referring to FIG. 5, the first position determination circuitry 41 includes a first determination sub-circuitry 51, configured to determine the first subframe and the sixth subframe in a radio frame as the synchronization subframe.

In some embodiment, the first position determination circuitry 41 may further include:

a frequency determination sub-circuitry 52, configured to determining a frequency of frequency resources for transmitting the synchronization subframe is greater than a preset threshold; and a second determination sub-circuitry 53, configured to add the second subframe and the seventh subframe in a radio frame as the synchronization subframe.

The second determination sub-circuitry 53 may add the second subframe and the seventh subframe in a radio frame as the synchronization subframe in other situations.

In some embodiment, the synchronization signal block transmitted through the first subframe and the synchronization signal block transmitted through the sixth subframe may further include a signal and a channel for an initial cell selection.

In some embodiment, the signal and the channel for an initial cell selection include at least a broadcast channel.

In some embodiment, when a number of downlink symbols in the synchronization subframe is within a preset range, the synchronization signal block transmitted through the second subframe and the synchronization signal block transmitted through the seventh subframe may only include a signal for measurement.

In some embodiment, the synchronization signal block may further include a signal and a channel for an initial cell selection.

In some embodiment, the device for transmitting the synchronization signal block may further include a symbol number determination circuitry, configured to determine that a number of downlink symbols in the synchronization subframe is within a preset range before transmitting the synchronization signal block according to the position of the synchronization subframe; the synchronization signal block includes only the signal for measurement.

In some embodiment, the signal for measurement may include: a primary synchronization signal and a secondary synchronization signal.

In some embodiment, the synchronization subframe may be further configured to carry a common control message.

In some embodiment, the synchronization subframe may be further configured to carry scheduling information of the common control message.

In some embodiment, the minimum period for the uplink/downlink configuration in a LTE system may be 5 milliseconds.

In some embodiment, a length of the synchronization subframe may be 1 millisecond.

In some embodiment of the present disclosure, the transmitting device for the synchronization signal block is configured to the network side. The principle of operation, embodiments and benefits thereof may refer to the method for transmitting the synchronization signal block, and it is not necessary to be repeated here.

Figure 6:
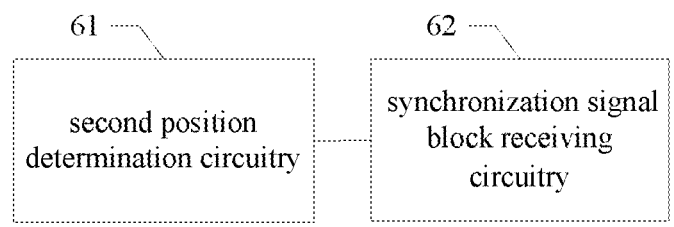
FIG. 6 schematically illustrates a structural diagram of a device for receiving the synchronization signal block in a 5G system according to an embodiment of the present disclosure.

Embodiments of present disclosure further provides a device for receiving a synchronization signal block in a 5G system, and its structural schematic diagram shown in FIG. 6, which may specifically include:

a second position determination circuitry 61, configured to determine a position of a synchronization subframe, and the synchronization subframe being configured to transmit the synchronization signal block, and the synchronization signal block at least includes a signal for measurement; and a synchronization signal block receiving circuitry 62, configured to detect or measure the synchronization signal block according to the position of the synchronization subframe within a minimum period for the uplink/downlink configuration in a LTE system.

In some embodiment, if an initial cell selection is ongoing, the synchronization signal block receiving circuitry 62 is configured to measure the synchronization signal block in the first subframe or the sixth subframe in a radio frame.

In some embodiment, after an initial cell selection is completed, the synchronization signal block receiving circuitry 62 is configured to conduct the synchronization signal block measurement in the first subframe and the second subframe, or measure the synchronization signal block in the sixth subframe and seventh subframe in a radio frame.

In some embodiment, if an initial cell selection is ongoing, the synchronization signal block receiving circuitry 62 is configured to conduct a broadcast channel detection in both the first subframe and the second subframe; or conduct the broadcast channel detection in both the sixth subframe and seventh subframe in a radio frame.

In some embodiment, the second position determination circuitry 61 is configured to determine a boundary of the synchronization subframe according to a TSS. The TSS is further configured to be a demodulation reference signal for a broadcast channel.

In some embodiment, the second position determination circuitry 61 is configured to determine the position of the synchronization subframe in a default setting. In some embodiment of the present disclosure, the device for receiving the synchronization signal block is configured to the network side. The principle of operation, embodiments and benefits thereof may refer to the method for receiving the synchronization signal block, and it is not necessary to be repeated here.

Those skilled in the art may understand that all or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for transmitting a synchronization signal, comprising:
   determining a time-domain position of a synchronization subframe, the synchronization subframe being configured to transmit the synchronization signal block, and the synchronization signal block at least comprising a signal for measurement; and
   transmitting the synchronization signal block according to the position of the synchronization subframe within 5 milliseconds, wherein the synchronization signal block comprises a broadcast channel;
   wherein determining a time-domain position of a synchronization subframe comprises:
   determining first two subframes within 5 milliseconds in a radio frame as the synchronization subframe, wherein the first two subframes comprise a first subframe and a second subframe;
   wherein the synchronization signal block is further configured to carry scheduling information of a common control message;
   wherein prior to said determining the first two subframes within 5 milliseconds in the radio frame as the synchronization subframe, the method further comprises:
   determining a frequency of frequency resources for transmitting the synchronization subframe to be greater than a preset threshold.

2. The method according to claim 1, wherein the synchronization signal block transmitted through the first subframe further comprises a signal and a channel for an initial cell selection.

3. The method according to claim 2, wherein the signal and channel for an initial cell selection at least comprise a broadcast channel.

4. The method according to claim 1, wherein when a number of downlink symbols in the synchronization subframe is not sufficient to support the transmission of both a signal for measurement and a signal for an initial cell selection, the synchronization signal block transmitted through the second subframe only contains the signal for measurement.

5. The method according to claim 1, wherein the synchronization signal block further comprises a signal and a channel for an initial cell selection.

6. The method according to claim 1, wherein prior to transmitting the synchronization signal block according to the position of the synchronization subframe, the method further comprises: determining that a number of downlink symbols in the synchronization subframe is not sufficient to support the transmission of both a signal for measurement and a signal for an initial cell selection, wherein the synchronization signal block only contains the signal for measurement.

7. The method according to claim 1, wherein the signal for measurement comprises: a primary synchronization signal and a secondary synchronization signal.

8. The method according to claim 1, wherein a length of the synchronization subframe is 1 millisecond.

* * * * *